Figure 1:
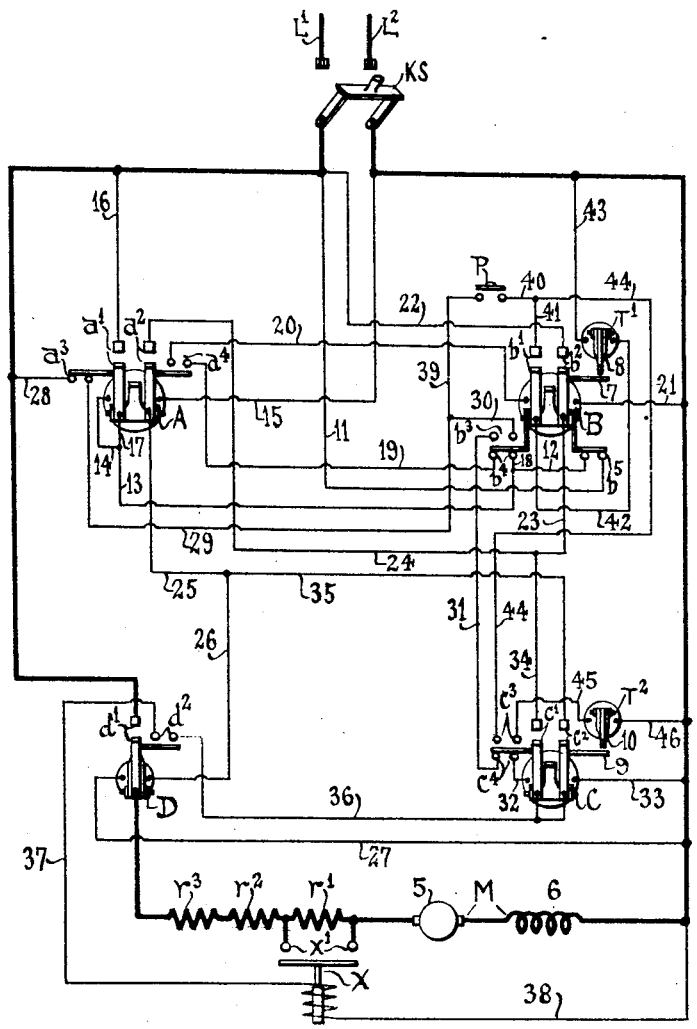

Oct. 9, 1928.

R. G. LOCKETT 1,686,753

MOTOR CONTROLLER

Filed Dec. 31, 1926      2 Sheets-Sheet 1

INVENTOR.
Ralph G. Lockett
BY Frank Hubbard
ATTORNEY.

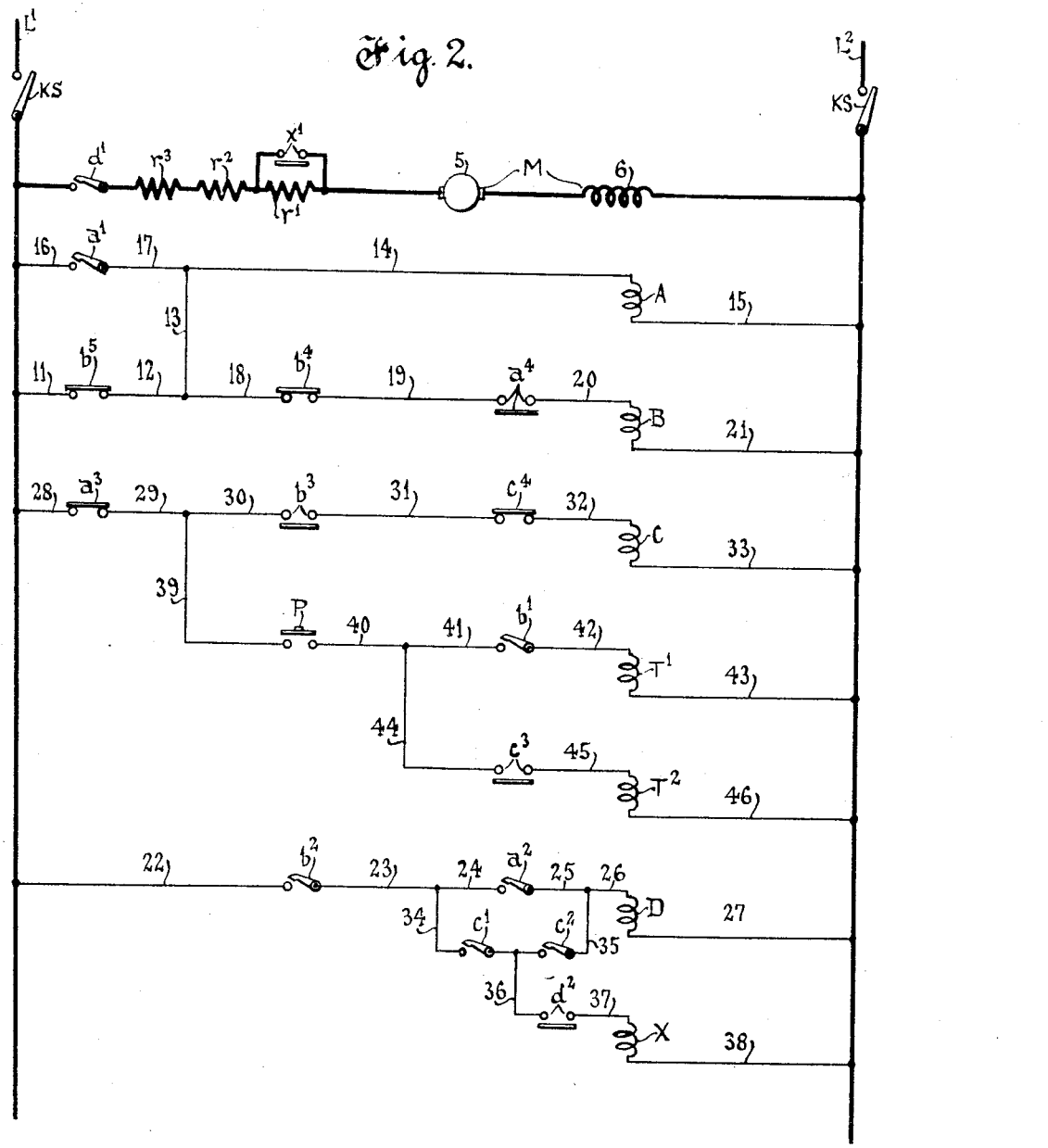

Patented Oct. 9, 1928.

1,686,753

UNITED STATES PATENT OFFICE.

RALPH G. LOCKETT, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed December 31, 1926. Serial No. 158,300.

This invention relates to improvements in motor controllers, and the invention more particularly relates to controllers for motors driving mine ventilating fans and the like.

In such installations the controller is preferably located at the mine along with the fan driving motor, whereas the source of power supply may be located a considerable distance away from the mine. It is therefore desirable that the controller shall function automatically to complete an energizing circuit for the motor to effect normal operation thereof at a given speed immediately upon energization of the supply lines. It is further extremely desirable that the controller shall function automatically to complete an energizing circuit for the motor to effect operation thereof at a higher speed upon re-energization of the supply lines after a failure of power supply. The fan may thus make up for lost time, so to speak; whereas the controller may be operated at will to re-establish the initial circuit connections for the motor whereby the latter is brought back to normal speed.

An object of the invention is to provide a simple and efficient controller for performing the aforementioned desirable functions.

Another and more specific object is to provide a controller which is operable automatically to initially connect a motor for operation thereof at a given speed, and which is also operable automatically to reconnect the motor for operation thereof at a higher speed upon re-establishment of the power supply after failure of the latter.

Another object is to provide associated means to permit changing from said higher speed to normal speed at will.

Other objects and advantages of the invention will hereinafter appear.

The accompanying drawing illustrates an embodiment of my invention which will now be described, it being understood that the invention is susceptible of embodiment in other forms without departing from the spirit and scope thereof as defined in the appended claims.

In the drawing,

Figure 1 is a schematic and diagrammatic view of a controller constructed and arranged in accordance with my invention, and Fig. 2 is an across-the-line diagram of the circuits and connections illustrated in Fig. 1.

Referring more particularly to Fig. 1, the reference character M designates a driving motor for a mine ventilating fan or the like (not shown). Said motor may be of any suitable type, and as shown comprises an armature 5 and series field 6. Resistance sections, $r^1$, $r^2$ and $r^3$ are normally adapted to be included in the motor circuit to provide for operation thereof at a given speed, means being provided for excluding certain of said resistance sections from circuit under given conditions to increase the speed of the motor, as hereinafter described.

The controller as shown comprises a plurality of normally open electromagnetically operable relays A, B, C and X and a normally open electromagnetically operable main switch D. Relays A, B and C are of the double-pole type, the main contacts of relay A being indicated at $a^1$ and $a^2$; whereas said relay is also provided with normally closed auxiliary contacts $a^3$ and normally open auxiliary contacts $a^4$. The main contacts of relay B are indicated at $b^1$ and $b^2$; whereas said relay is also provided with normally open auxiliary contacts $b^3$ and normally closed auxiliary contacts $b^4$ and $b^5$. The main contacts of relay C are indicated at $c^1$ and $c^2$; whereas said relay is also provided with normally open auxiliary contacts $c^3$ and normally closed auxiliary contacts $c^4$. The main contacts of switch D are indicated at $d^1$; whereas said switch is also provided with normally open auxiliary contacts $d^2$. The contacts of relay X are indicated at $x^1$.

Relay B is adapted upon closure to be mechanically held in closed position through engagement of a suitable projection 7 with a latch member 8 of an electromagnetically releasable latching device $T^1$. Relay C is likewise adapted upon closure to be mechanically held in closed position through engagement of projection 9 with a latch member 10 of an electromagnetically releasable latching device $T^2$. A normally open push button switch P is adapted when closed to provide for joint energization of the tripping coils of devices $T^1$ and $T^2$, whereby relays B and C are permitted to reopen. If desired, a knife switch KS may be provided for disconnecting the motor and the controller from the supply lines $L^1$, $L^2$.

Operation of the controller will now be described with particular reference to the diagram of Fig. 2. Thus assuming energization of power supply lines $L^1$, $L^2$ and closure of knife switch KS, an energizing circuit will be provided for the operating winding of relay A; said circuit extending from line L¹ by conductor 11 through normally closed auxiliary contacts $b^5$ of relay B, conductors 12, 13 and 14 through said winding, and by conductor 15 to line L². Relay A in closing completes a maintaining circuit for its winding; said maintaining circuit extending from line L¹ by conductor 16 through the main contacts $a^1$ of said relay, conductors 17 and 14 through said winding, and by conductor 15 to line L².

Upon closure of the normally open auxiliary contacts $a^4$ of relay A an energizing circuit is provided for the operating winding of relay B; said circuit extending from L¹ by conductor 16 through main contacts $a^1$ of relay A, conductors 17, 13 and 18 through normally closed auxiliary contacts $b^4$ of relay B, conductor 19 through said auxiliary contacts $a^4$, conductor 20 through said winding, and by conductor 21 to line L².

Relay B thereupon closes and is latched in closed position by engagement of projection 7 with latch member 8 (Fig. 1); whereas said relay in closing interrupts its own energizing circuit through opening of its auxiliary contacts $b^4$, and also interrupts the initial energizing circuit for the winding of relay A through opening of its auxiliary contacts $b^5$. Relay A in closing effects opening of its normally closed auxiliary contacts $a^3$, thereby preventing completion of an energizing circuit for the winding of relay C upon closure of the normally open auxiliary contacts $b^3$ of relay B, as will be obvious.

Upon closure of relays A and B in the manner aforedescribed, an energizing circuit is provided for the winding of main switch D; said circuit extending from line L¹ by conductor 22 through the main contacts $b^2$ of relay B, conductors 23 and 24 through the main contacts $a^2$ of relay A, conductors 25 and 26 through said winding, and by conductor 27 to line L².

Switch D thereupon closes and completes an energizing circuit for motor M to effect operation thereof at a predetermined normal speed, said circuit extending from line L¹ through the main contacts $d^1$ of said switch, thence through resistance sections $r^3$, $r^2$ and $r^1$ in series, and thence through the armature 5 and series field 6 to line L². Motor M continues to operate at normal speed pending failure of line voltage or other interruption of the power supply. Under such conditions relay A assumes its normally open position, whereas relay B is held in its closed position by the latching means aforedescribed.

Upon re-energization of the power supply lines energization of the winding of relay A is prevented due to open positioning of auxiliary contacts $b^5$ of relay B, as aforedescribed. However, with relay A open and relay B closed under these conditions, an energizing circuit is provided for the winding of relay C; said circuit extending from line L¹ by conductor 28 through normally closed contacts $a^3$ of relay A, conductors 29 and 30 through normally open contacts $b^3$ of relay B, conductor 31 through normally closed contacts $c^4$ of relay C, conductor 32 through said winding, and by conductor 33 to line L².

Relay C thereupon closes and is latched in closed position by engagement of projection 9 with latch member 10 (Fig. 1); whereas said relay in closing interrupts its own energizing circuit through opening of its auxiliary contacts $c^4$. Relays B and C being thus closed, an energizing circuit is provided for the winding of switch D; said circuit extending from line L¹ by conductor 22 through main contacts $b^2$ of relay B, conductors 23 and 34 through main contacts $c^1$ and $c^2$ of relay C, conductors 35 and 26 through said winding, and by conductor 27 to line L². Closure of main contacts $d^1$ of switch D completes a circuit for motor M, through resistance sections $r^3$, $r^2$ and $r^1$, as aforedescribed. Moreover, upon closure of normally open contacts $d^2$ of switch D under the last mentioned conditions, an energizing circuit is provided for the winding of relay X. Said circuit may be traced from line L¹ by conductor 22, through main contacts $b^2$ of relay B, conductors 23 and 34 through main contacts $c^1$ of relay C, conductor 36 through said auxiliary contacts $d^2$, conductor 37 through said winding, and by conductor 38 to line L². Relay X thereupon effects closure of its contacts $x^1$, thus short-circuiting resistance section $r^1$. Motor M thereupon operates at an increased speed until it is desired to again operate the motor at normal speed.

Such reduction in speed of motor M may be obtained by momentarily depressing push button switch P, which provides an energizing circuit for the tripping coils of each of the latching devices T¹ and T². The energizing circuit for the coil of device T¹ may be traced from line L¹ by conductor 28 through normally closed contacts $a^3$ of relay A, conductors 29 and 39 through said push button switch P, conductors 40 and 41 through main contacts $b^1$ of relay B, conductor 42 through said coil, and by conductor 43 to line L². Similarly, the energizing circuit for the coil of device T² extends from line L¹ to conductor 40 as just traced, thence by conductor 44 through auxiliary contacts $c^3$ of relay C, by conductor 45 through said coil, and by conductor 46 to line L².

Relays B and C thereupon open to effect interruption of the aforedescribed energizing circuit for the winding of relay X, whereas the energizing circuit for the winding of switch D is also interrupted temporarily. However, immediately upon opening of relay B an energizing circuit is provided for the winding of relay A, in the manner first described, whereas upon reclosure of relay A an energizing circuit is again provided for the winding of relay B, as will be obvious. With relays A and B thus reclosed an energizing circuit is provided for the winding of switch D, which closes to complete the first mentioned circuit of motor M for operation of the latter at normal speed.

It is to be noted that when relays B and C are latched in closed position in the manner aforedescribed said high speed connections for the motor will be provided upon restoration of the power line voltage after failure thereof. In other words, reopening of relays B and C is dependent upon operation of the push button switch P, as aforeindicated.

While I have particularly described my invention as applied to the control of driving motors for mine ventilating fans, it will be obvious to those skilled in the art that the same is likewise applicable to the control of driving motors for liquid pumps, and in other installations wherein the particular control functions hereby obtainable are desired.

It is to be understood that the resistance varying means herein shown is merely illustrative, inasmuch as other types of motor starting and accelerating devices may obviously be employed. Thus, the arrangement may be such that a plurality of resistance sections are initially included in and a portion thereof gradually excluded from the circuit of the motor to provide for starting and acceleration thereof to normal speed, whereas under the other conditions aforementioned a larger portion of said resistance will be excluded to provide for acceleration of the motor to a higher speed.

What I claim as new and desire to secure by Letters Patent is:

1. In a controller for electric motors, the combination with means for initially completing a circuit for the motor for effecting running thereof at a predetermined constant speed, and means operable automatically upon restoration of the power supply after failure thereof for completing a circuit for the motor for effecting running thereof at a different predetermined speed.

2. In a controller for electric motors, the combination with means for initially completing a circuit for the motor for effecting running thereof at a predetermined constant speed, means operable automatically upon restoration of the power supply after failure thereof for completing the circuit of the motor for effecting running thereof at a predetermined increased speed.

3. In a controller for electric motors, the combination with means for initially completing a circuit for the motor for effecting running thereof at a predetermined constant speed, means operable automatically upon restoration of the power supply after failure thereof for completing a circuit for the motor for effecting running thereof at a predetermined increased speed, and means operable thereafter for reconnecting the motor for effecting running thereof at said first-mentioned speed.

4. In a controller for electric motors, the combination with means operable automatically to initially complete a circuit for the motor for effecting running thereof at predetermined constant speed, means operable automatically upon restoration of the power supply after failure thereof to complete a circuit for the motor for effecting running thereof at a predetermined increased speed, and manually operable means for effecting interruption of said last-mentioned circuit to thereby permit automatic restoration of said first-mentioned circuit.

5. In a controller for motors driving mine ventilating fans and the like, the combination with electroresponsive means operable automatically to initially complete a circuit for the motor for effecting operation thereof at a given speed, said electroresponsive means being operable automatically upon restoration of the power supply after failure thereof to complete a circuit for the motor for effecting operation thereof at a relatively higher speed, and manually operable means for restoring said electroresponsive means to its initial condition to thereby provide for automatic restoration of said first mentioned circuit for the motor.

6. In a controller for motors driving mine ventilating fans and the like, the combination with electroresponsive means operable automatically to initially complete a circuit for the motor for effecting operation thereof at normal speed, said means comprising a normally open electroresponsive main switch and a pair of normally open electroresponsive relays adapted when closed to complete an energizing circuit therefor, contacts on one of said relays requiring open positioning of the latter prior to completion of the energizing circuit of the other relay and contacts on said second mentioned relay requiring closure of the latter prior to completion of the energizing circuit of said first mentioned relay, and means for holding said first mentioned relay in closed position upon failure of line voltage while permitting reopening of said second mentioned relay whereby upon return of line voltage an energizing circuit is completed for a third normally open electroresponsive relay, said first mentioned and third mentioned relays being adapted when closed to complete a circuit for the motor for operation thereof at a speed above normal.

7. In a controller for motors driving mine ventilating fans and the like, the combination with electroresponsive means operable automatically to initially complete a circuit for the motor for effecting operation thereof at normal speed, said means comprising a normally open electroresponsive main switch and a pair of normally open electroresponsive relays adapted when closed to complete an energizing circuit therefor, contacts on one of said relays requiring open positioning of the latter prior to completion of the energizing circuit of the other relay and contacts on said second mentioned relay requiring closure of the latter prior to completion of the energizing circuit of said first mentioned relay, means for holding said first mentioned relay in closed position upon failure of line voltage while permitting reopening of said second mentioned relay whereby upon return of line voltage an energizing circuit is completed for a third normally open electroresponsive relay, said first mentioned and third mentioned relays being adapted when closed to complete a circuit for the motor for operation thereof at a speed above normal, and manually operable means for restoring said electroresponsive means to initial condition to provide for automatic restoration of said first mentioned circuit for the motor.

8. In a motor controller, in combination, a normally open electroresponsive switch adapted when closed to effect completion of a circuit for the motor for operation thereof at a given speed, a pair of normally open electroresponsive relays adapted when closed to initially complete the energizing circuit of said switch, means requiring open positioning of one of said relays to effect energization and closure of the other of the same, means requiring closure of said second mentioned relay to effect energization and closure of said first mentioned relay, mechanical means for latching said first mentioned relay in closed position to thereby prevent re-energization of said second mentioned relay upon restoration of the power supply after failure thereof, a third normally open electroresponsive relay the energizing circuit of which is completed under the aforementioned conditions of closure of said first mentioned relay and opening of said second mentioned relay, means adapted upon closure of said first mentioned and third mentioned relays to again complete the energizing circuit of said switch, and means adapted upon closure of said third mentioned relay and said switch to commutate the circuit connections of said motor for effecting operation thereof at an increased speed.

9. In a controller for electric motors, in combination, means for initially connecting the motor for effecting operation thereof at a given speed, and means operable upon restoration of the power supply after failure thereof to connect the motor for effecting operation thereof at a higher speed, said means comprising a normally open electroresponsive main switch, and a pair of normally open electroresponsive relays for initially controlling the energizing circuit thereof, means requiring open positioning of one of said relays to effect energization and closure of the other, means requiring closure of the second mentioned relay to effect energization and closure of the first mentioned relay, mechanical means for holding said first mentioned relay in closed position upon failure of line voltage, a third normally open electroresponsive relay the energizing circuit of which is completed during simultaneous closure of said first mentioned relay and opening of said second mentioned relay, said first mentioned and third mentioned relays when closed being adapted to again complete the energizing of said main switch for effecting connection of said motor for operation thereof at said given speed, and means associated with said switch and said third mentioned relay for simultaneously commutating the circuit connections of the motor for effecting operation of the latter at an increased speed.

10. In a motor controller, in combination, a normally open electroresponsive switch adapted when closed to complete an energizing circuit for the motor for operation thereof at a given speed, means for initially completing an energizing circuit for said switch, said means comprising a normally open electroresponsive relay having contacts adapted when closed to provide a maintaining circuit therefor, a second normally open electroresponsive relay having normally closed auxiliary contacts adapted to automatically complete an energizing circuit for said first mentioned relay, said first mentioned relay also having normally open contacts adapted when closed to complete an energizing circuit for said second mentioned relay, said second mentioned relay in closing being adapted to interrupt its energizing circuit, mechanical means for latching said second mentioned relay in closed position, said first mentioned relay and said switch being movable to open position upon interruption of line voltage, said first mentioned relay in open position and said second mentioned relay in closed position being adapted to complete an energizing circuit for a third normally open electroresponsive relay upon return of line voltage, said second mentioned and third mentioned relays when closed being adapted to complete an alternative energizing circuit for said switch, and cooperating means on said switch and said relays for completing the energizing circuit for another relay, said last mentioned relay when closed being adapted to commutate the circuit of said motor for effecting operation thereof at a higher speed.

11. In a motor controller, in combination, normally open electroresponsive relays A, B and C, and an electroresponsive main switch D and an electroresponsive accelerating relay X to be controlled thereby, means requiring open positioning of relay B to effect energization and closure of relay A, and means requiring closure of relay A to effect energization and closure of relay B, said relays A and B when closed being adapted to complete an energizing circuit for switch D only to provide for operation of the motor at a given speed, and means adapted upon failure of power line voltage to permit reopening of relay A and switch D while maintaining relay B in closed position, whereby upon return of power an energizing circuit is completed for relay C, said relays B and C when closed being adapted to again complete an energizing circuit for switch D to provide for operation of the motor at said given speed and being also adapted to cooperate with said switch D to provide an energizing circuit for relay X to provide for operation of the motor at a higher speed.

12. In a motor controller, in combination, normally open electroresponsive relays A, B and C, and an electroresponsive main switch D and an electroresponsive accelerating relay X to be controlled thereby, means requiring open positioning of relay B to effect energization and closure of relay A, and means requiring closure of relay A to effect energization and closure of relay B, said relays A and B when closed being adapted to complete an energizing circuit for switch D only to provide for operation of the motor at a given speed, means adapted upon failure of power line voltage to permit reopening of relay A and switch D while maintaining relay B in closed position, whereby upon return of power an energizing circuit is completed for relay C, said relays B and C when closed being adapted to again complete an energizing circuit for switch D to provide for operation of the motor at said given speed and being also adapted to cooperate with said switch D to provide an energizing circuit for relay X for effecting operation of the motor at a higher speed, and manually controlled means for effecting reopening of relays B and C whereby switch D and relay X are de-energized and to permit reclosure of switch D only through automatic reclosure of relays A and B in the sequence aforementioned.

In witness whereof, I have hereunto subscribed my name.

RALPH G. LOCKETT.